Oct. 12, 1926.
H. E. BINKELE
CONDIMENT HOLDER
Filed Oct. 6, 1924
1,602,745
2 Sheets-Sheet 1
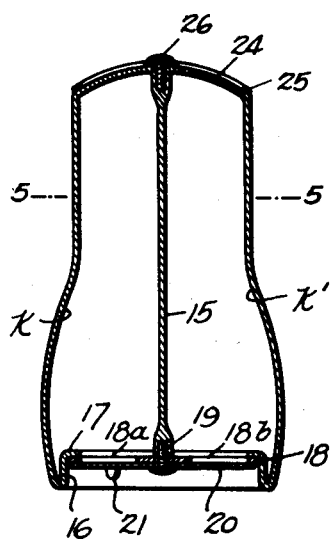
Fig.1.
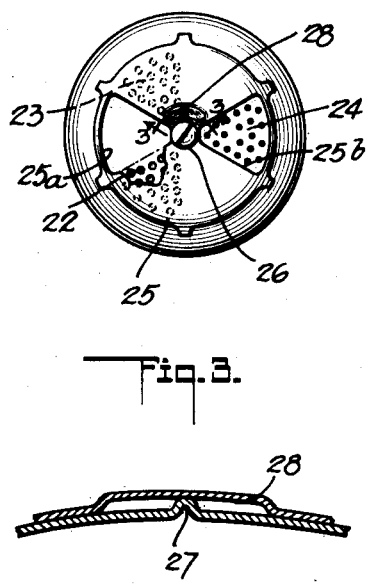
Fig.2.
Fig.3.
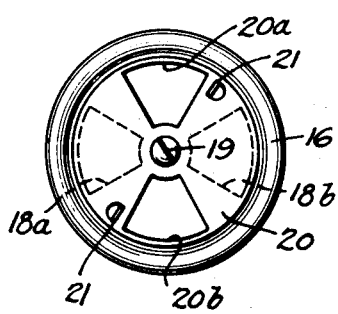
Fig.4.
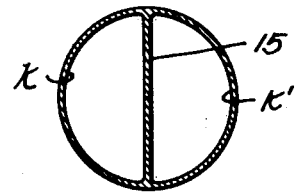
Fig.5.
Inventor
HILMAR E. BINKELE
By Munn & Co
Attorneys Oct. 12, 1926.
H. E. BINKELE
1,602,745
CONDIMENT HOLDER
Filed Oct. 6, 1924  2 Sheets-Sheet 2
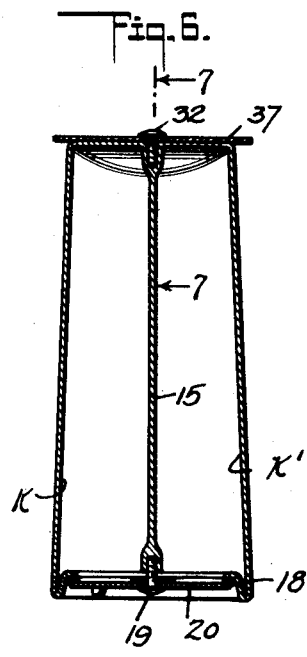
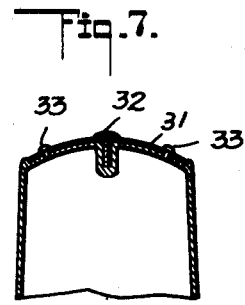
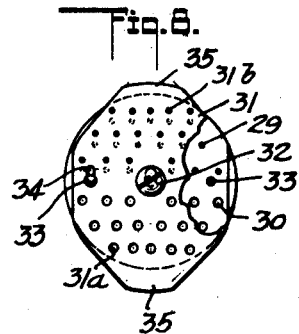
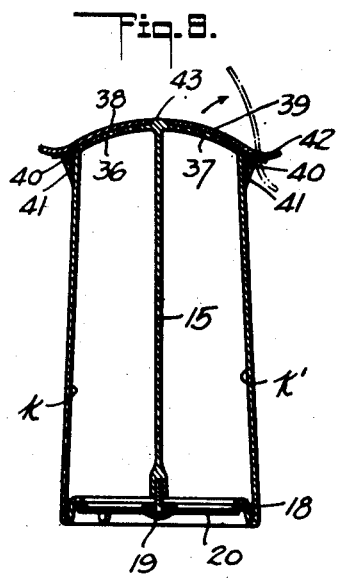
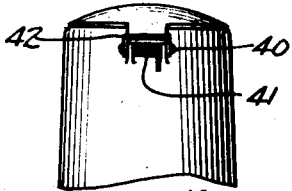
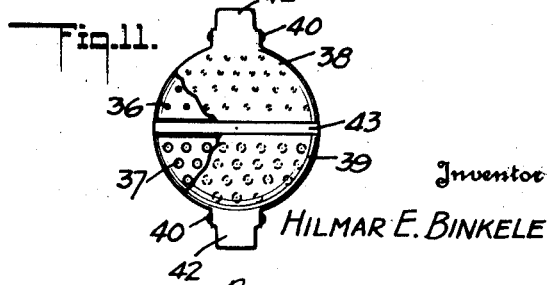
Inventor
HILMAR E. BINKELE
By Munn & Co.
Attorneys Patented Oct. 12, 1926.

1,602,745

UNITED STATES PATENT OFFICE.

HILMAR E. BINKELE, OF LOS ANGELES, CALIFORNIA.

CONDIMENT HOLDER.

Application filed October 6, 1924. Serial No. 742,076.

My invention relates to condiment holders, and the purpose of my invention is the provision of a condiment holder in which both salt and pepper or any other two comminuted condiments can be separately contained in and dispensed from one and the same holder, thus eliminating the necessity of providing a separate holder for each of the condiments.

It is also a purpose of my invention to provide a condiment holder of the above described character which is capable of being manufactured at a minimum cost by virtue of its structural simplicity, and one having separate compartments for the salt and pepper, with filling and dispensing openings for each provided with shutters or closure members to control the openings in a manner to permit either compartment to be filled and the condiment to be independently dispensed.

I will describe only three forms of condiment holders embodying my invention and will then point out the novel features thereof in claims.

In the accompanying drawings:—

Figure 1 is a view showing in vertical section one form of condiment holder embodying my invention;

Figure 2 is a top plan view of the condiment holder shown in Figure 1;

Figure 3 is an enlarged sectional view taken on the line 3—3 of Figure 2;

Figure 4 is a bottom plan view of the condiment holder shown in Figure 1;

Figure 5 is a transverse sectional view taken on the line 5—5 of Figure 1;

Figure 6 is a vertical sectional view of another form of condiment holder embodying my invention;

Figure 7 is a fragmentary vertical sectional view taken at right angles to the view shown in Figure 6;

Figure 8 is a top plan view of the condiment holder shown in Figures 6 and 7, with a portion of the closure member thereof broken away;

Figure 9 is a vertical sectional view of a third form of condiment holder embodying my invention;

Figure 10 is a fragmentary view showing in side elevation the condiment holder shown in Figure 9;

Figure 11 is a top plan view of the condiment holder shown in Figures 9 and 10, with a portion of the closure member broken away.

Similar reference characters refer to similar parts in each of the several views.

Referring specifically to the drawings, and particularly to Figure 1, I have here shown a condiment holder comprising a seller or container K constructed of any suitable material and of tubular form, with its interior divided longitudinally into compartments $k$ and $k'$ by means of a partition 15. The lower end of the container is provided with an annular, in-turned collar 16, having a right angle annular flange 17 against the under side of which bears the closure plate 18 provided with two openings $18^a$ and $18^b$, which constitute filling openings for the compartments $k$ and $k'$, respectively. The closure member 18 is firmly secured in contact with the flange 17 by means of a screw or other suitable fastening member 19, extending through the plate and engaging within the lower end of the partition 15. This screw also serves to provide a rotatable mounting for a shutter 20, which is clearly shown in Figure 4 as of disk form and provided with two openings $20^a$ and $20^b$, which, in the open position of the shutter, are adapted to register with the openings $18^a$ and $18^b$, respectively, whereby salt and pepper may be introduced into the respective compartments. In the closed position of the shutter, the openings $20^a$ and $20^b$ are out of registration with the openings $18^a$ and $18^b$, as illustrated in Figure 4. The shutter can be rotated in either direction to effect opening or closing of the openings $18^a$ and $18^b$ through the medium of lugs 21 formed in the shutter by out-striking the latter, as will be understood.

The top of the container K is closed and provided with three groups of perforations indicated at 22, 23 and 24, in Figure 2. The groups 22 and 23 are spaced from each other and from the group 24, and are designed to provide dispensing openings for the dispensing of one condiment, preferably salt, from one of the compartments $k$. The other group 24 performs a similar function for the pepper compartment $k'$. As shown in Figure 2, these perforations are controlled by means of a closure member or shutter 25 mounted on a screw 26 so as to rotate and thus move openings $25^a$ and $25^b$ into covering or uncovering position with respect to the groups of perforations 22, 23 or 24. By virtue of a lug 27 formed by striking the top of the container, and a groove 28 formed in the shutter 25, the rotational movement of the shutter in either direction is limited so that the opening 25 can expose either group of perforations 22 or 23, and the opening 25$^b$ expose the perforations 24.

In practice, the compartments $k$ and $k'$ are filled with salt and pepper, respectively, through the manipulation of the shutter 20, and with the shutter in closed position it will be clear that the container can be inverted for the dispensing of the condiments from the compartments separately by manipulation of the dispensing shutter 25.

Referring now to Figures 6, 7 and 8, I have here shown another form of condiment holder embodying my invention in which the container or seller is substantially the same as the first form of my invention, with the exception that the top of the container is of arcuate form and is provided with two groups of perforations 29 and 30, one for each of the compartments $k$ and $k'$. These groups of perforations are controlled by a closure member 31 which consists of an arcuate plate shaped to conform to the curvature of the top and mounted to slide in a plane at right angles to the plane of the curve of the plate to cover or uncover the groups of perforations. The mounting of the plate to obtain this sliding movement consists of a screw 32 and headed pins 33 extending through slots 34 in the plate, the screw being secured in the partition 15 and the pins in the top of the container. With this mounting, the closure plate is limited to two extreme positions, and at one extreme position a group of perforations 31$^a$ register with a group of perforations 30, and in the other extreme position a group of perforations 31$^b$ formed therein register with the perforations 29. The closure plate as shown in Figure 8 is so shaped that it provides extensions 35 which are adapted to be gripped in moving the plate to either of its two extreme positions.

Referring now to Figures 9, 10 and 11, therein is shown a third form of condiment holder embodying my invention which is identical with the first two forms with the exception of the top and which, although rounded as in the first form, is provided with only two groups of perforations 36 and 37, one for each of the compartments $k$ and $k'$. These groups of perforations are controlled by shutters 38 and 39, respectively, hingedly supported as indicated at 40 and urged by means of springs 41 into engagement with the top. Operating handles 42 project from the periphery of the shutters to permit the latter to be moved to open position against the action of the springs 41, and in such open position the groups of perforations 36 and 37 are exposed to allow the dispensing of the condiments. It is to be understood that the shutters are adapted to be operated independently of each other to allow of separate dispensing of either condiment. In the closed position of the shutters they are separated by a rib 43 formed in the top of the container between the two groups of perforations.

Although I have herein shown and described only three forms of condiment holders embodying my invention, it is to be understood that various changes and modifications may be made herein without departing from the spirit of the invention and the spirit and scope of the appended claims.

I claim as my invention:—

1. A condiment holder comprising a container having a partition dividing it interiorly into a pair of compartments, and including a cylindrical body having its bottom open and the wall thereof in-turned to provide an annular seat, a plate secured against the seat and having filling openings one for each of the compartments, a closure member connected to the lower end of the partition movable to control the filler openings and common to all the openings, the top of the container being closed and perforated, and a second closure member for the perforated top pivoted to the upper end of the partition which is movable to expose the perforations for one compartment without opening those of the other.

2. A condiment holder comprising a container having a closed end, a partition integral with and depending from the closed end and dividing the container into a pair of compartments and including a cylindrical body having its bottom open and the wall thereof in-turned to provide an annular seat, a plate secured against the seat and having filling openings, one for each of the compartments, a closure member pivoted to the partition and being movable to control the filler openings, the closed end of the container being closed and perforated, and the perforations arranged in groups with one group for each of the compartments, and a second closure member mounted on the closed end of the container, and comprising pivoted sections urged into closing position with respect to the perforated top with one section for each group of perforations, said sections being movable independently of each other to expose the groups of openings.

3. A condiment holder comprising a container having a closed upper end, a partition integral with the closed end and dividing the closure interiorly into a pair of compartments and including a cylindrical body having its bottom open and the wall thereof inturned to provide an annular seat, a plate secured against the seat and having filling openings, one for each of the compartments, a closure member pivoted to the partition and being movable to control the filler openings, the top of the container being perforated, and the perforations arranged in groups with one group for each of the compartments, and a second closure member having screw connection with the upper end of the partition and slidable to open or close one group of perforations and simultaneously close or open the other.

HILMAR E. BINKELE.